Aug. 10, 1954 L. W. KINNEY ET AL 2,685,955
CONVEYER APPARATUS FOR COMPACTING ARTICLES
Filed Dec. 31, 1952 2 Sheets-Sheet 1.
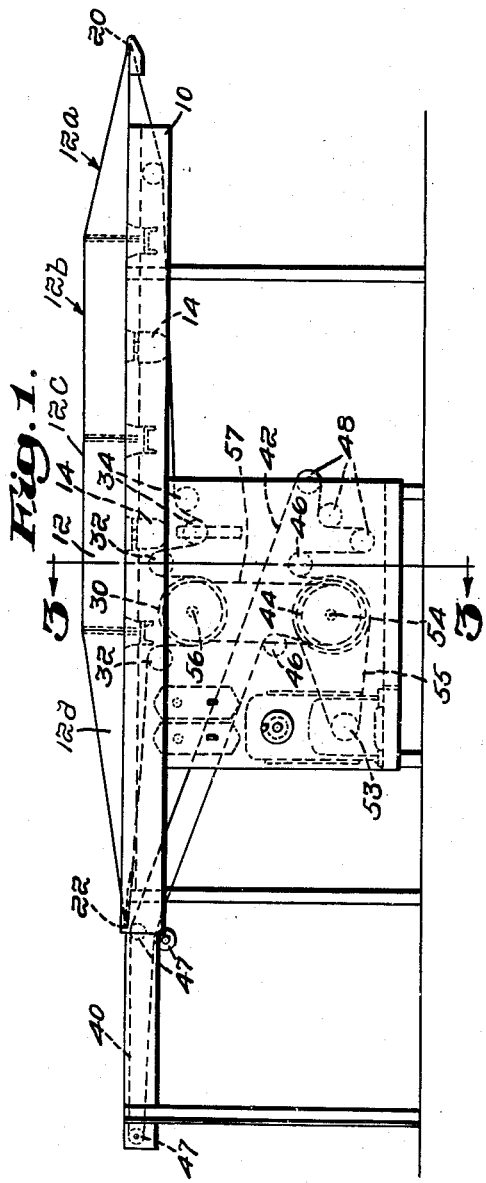
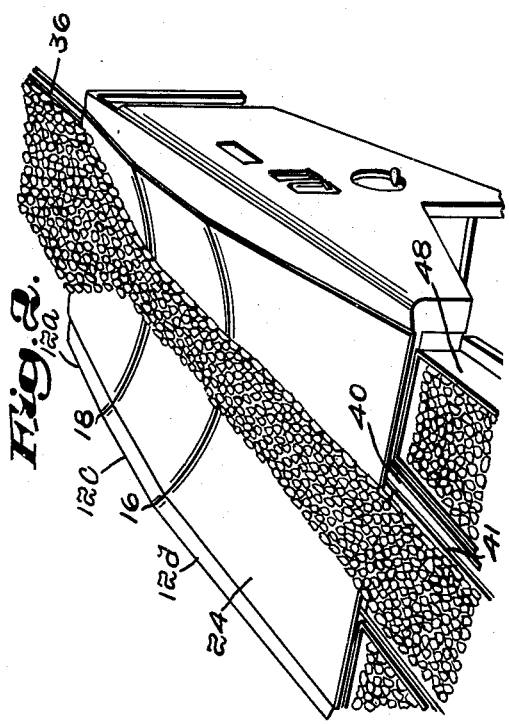
Inventors:
Lawrence W. Kinney
John H. Gragg
Rayland J. Patrick
Attorney

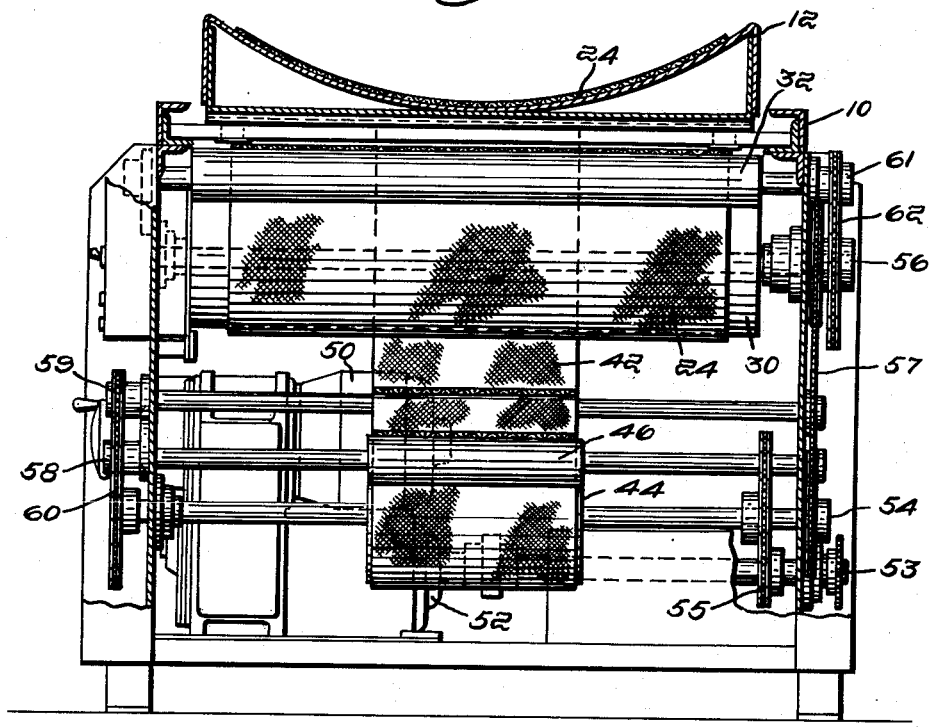

Patented Aug. 10, 1954

2,685,955

UNITED STATES PATENT OFFICE 2,685,955

CONVEYER APPARATUS FOR COMPACTING ARTICLES

Lawrence W. Kinney, Winchester, Mass., and John H. Grace, Portsmouth, N. H., assignors to J. W. Greer Company, Cambridge, Mass., a corporation of Massachusetts Application December 31, 1952, Serial No. 328,888

3 Claims. (Cl. 198—34)

This invention relates to conveyor systems and, more particularly, to apparatus for compacting individual articles as they advance in relatively widely spaced relation on a continuously advancing conveyor, so that they emerge at the delivery end of the conveyor in compacted abutting relation for easier handling in a succeeding packaging or other operation.

The invention is especially adapted for advantageous use in the confectionary industry in the handling of chocolate-coated candies. The final manufacturing operation in chocolate-coated candy manufacture is the cooling of the chocolate coating which is applied in a semi-liquid or liquid state at elevated temperature to the candy centers. Modern methods of cooling are continuous operations, the individual candies being carried on a belt through a suitable cooling unit. For this operation, the individual candy units are adequately spaced from one another to prevent marring of the soft coatings by contact with adjacent units prior to hardening of the coatings and also to insure good air circulation therebetween.

At the delivery end of the cooler, the candies are ready for packing. If this be done by hand, the units have to be picked off the conveyor belt individually, a substantial labor operation.

Proposals have thus previously been made for compacting the candies and arranging them in compacted groups on cardboard liners so that each group may be lifted off the conveyor as a group supported by an underlying cardboard sheet which is lowered into the package such as a stock box.

United States Patents No. 2,442,350 and No. 2,542,330 describe systems utilizing stationary or moving deflectors interposed in the path of the advancing chocolates. These devices have the very great disadvantage of forcing the side surfaces of the chocolates into frictional engagement with surfaces of the deflectors and into forceable engagement with adjacent units, since the narrowest dimension of the unopposed pathway for the chocolates is fixed. Forceable jamming together, both laterally and longitudinally, of the advancing units cannot be avoided if any complete compacting is to be accomplished.

In accordance with this invention, no obstruction by way of deflectors or plows need be interposed in the path of the chocolate units. The compacting is, on the contrary, effected by a combination of shaping the transverse cross-section of the conveyor and vibrating the shaped portion of the conveyor so as to momentarily and successively break the frictional resistance between the bottom surface of each unit and the conveyor surface on which it is riding and thus cause each unit to gravitate towards the center of the conveyor unless met by the resistance of more inwardly disposed units. No pressure other than a gentle contacting action, caused by the uniform vibration of all the units and effects of gravity, is imposed on any unit, the outlying units never having mechanical lateral pressure imposed on them, and never communicating that pressure to inwardly lying units.

The apparatus of this invention also has the advantage that no matter what the rate of feed, the outgoing stream of chocolates will always be laterally compacted, the width of the outgoing stream varying according to the rate of input. If the input is great enough to provide more than a single file line of output, the stream will be longitudinally, as well as laterally, compacted. No deflector adjustment is necessary, regardless of the rate of input.

These features of the machine are illustrated in the accompanying drawings, wherein:

Fig. 1 is a diagrammatic elevational view of the apparatus;

Fig. 2 is a perspective view of a machine of the type shown in Fig. 1 but modified with respect to its length and with an added side cover plate; and Fig. 3 is a cross-sectional view taken along the line 3—3 of Fig. 1.

The machine as shown in Fig. 1 includes a table-like frame 10, over which is suspended a shaped sectionalized trough-like element 12 which is mounted on two longitudinally aligned vibrators 14. Fig. 1 shows four sections 12a, 12b, 12c, 12d rigidly fixed to one another but in the form shown in Fig. 2, section 12b, which is a duplicate of section 12c, together with its vibrator, is omitted to shorten the overall length of the element 12. The upper surface of the segments 12b and 12c are concave in transverse cross-section. Thus, in Fig. 2, segment 12c extends from the point 16 to the point 18. End section 12a extends towards the end of the machine with its transverse cross-section gradually and smoothly merging into a straight line cross-section at a horizontal knife edge 20 of the element 12. At the other or left-hand end, section 12d, there is a similar parallel knife edge 22 and the top surface of the element 12 between the knife edge 22 and the transverse line at 16 is also a gradual smooth merger. The median longitudinal line of the upper surface of element 12 lies substantially in the plane of the two knife edges 20 and 22; and the upper surface of element 12 extends upwardly and outwardly from the median line to form the trough-like surface.

Across this supporting and shaping surface 12, there is passed an endless belt 24 of canvas or other suitable material which also passes around a series of driving, adjusting and tensioning rollers 30, 32, 34, etc. The support shapes the belt 24 to the contour of the surface, there being sufficient tension and elasticity in the material of the belt to permit the shaping.

The vibrator units 14 are of a known construction available on the market and act with such high frequency that the vibratory motion of the element 12 is not perceptible. As previously stated, in the case of the shorter element 12 of the Fig. 2 machine, a single vibrator is sufficient.

With suitable adjustment of the speed of the belt 24, the leading knife edge 20 may be brought adjacent the delivery end of an infeed conveyor 36 leading from a cooler, as shown in Fig. 2, and as the chocolates move onto the vibrating element 24, they tend to compact towards the middle under the influence of the vibration and they are fed from the delivery end of the belt 24 onto an outgoing conveyor section 40.

Although not forming, in its broad aspect, any part of this invention, the outgoing conveyor 40 may be of that type which presents to the delivery end of the belt 24 individual cardboard liners 41 which are, either by hand or by known mechanism, successively positioned from a hopper onto the conveyor 40, for which purpose it has an inclined traverse 42 leading around suitable drive and tensioning rollers 44, 46, 47, 48, etc. up into the plane of and adjacent to the knife edge 22. The chocolates, as they pass off belt 24, drop onto the individual liners and, hence, may be lifted in groups from the conveyor 40 and tiered on the liners in stock boxes 48.

Fig. 3 shows in more detail the drive mechanism including motor 50, reduction gear box 52 and drive shaft 53. Shaft 54 on which roller 44 is mounted is driven through a sprocket chain 55 from drive shaft 53; and shaft 56, on which roller 30 is mounted, is driven from shaft 54 through sprocket chain 57. Shafts 58 and 59 carrying rollers 46 are driven from shaft 54 through sprocket chain 60; while rollers 32 are carried on shafts 61 driven from shaft 56 through a sprocket chain 62.

The frame of the apparatus forms suitable bearings for all of these shafts, and preferably belts 24 and 40 are driven at the same surface speed, so that the cardboard liners 41 are fed in at edge-to-edge relation up the inclined traverse of belt 42 and thus present a continuous cardboard surface onto which the grouped chocolates can pass. Their speed is normally correlated to the speed of belt 36 (which is more or less fixed by the speed of previous coating operations), and depending upon the size of the chocolates and their spacing on belt 36, to produce a compacted stream at the output end of belt 24 of a width just slightly less than that of the cardboards 41 so that the chocolates will cover the cardboards widthwise. Normally, the spacing of the chocolates on belt 36 is so great that the speed of belts 24 and 40 will be greater than that of belt 36.

The appearance of chocolates processed on this apparatus is markedly improved. The chocolates are not touched by human fingers which cannot help but leave fingerprints or dull the gloss of the coatings and their side surfaces are not scratched or marred by contact with plows or deflectors or dented by forceable lateral jamming. In operation of the devices of this invention, therefore, the appearance of the chocolates as they emerge from the cooler is substantially unaffected, being free from finger or plow marks. Stock-box group packaging is nevertheless accomplished with substantial savings in labor.

We claim:

1. Apparatus for compacting articles as they move in spaced relation along a conveyor comprising a support, a belt passing over said support, said support having a portion of its upper surface extending upwardly and outwardly from the median line of said belt to shape said belt and form a traverse therefor which is concave in transverse cross-section, said concave surface portion gradually and smoothly merging towards at least one end of the support into a horizontal traverse which has a straight line transverse cross-section, means for advancing said belt across said support, said support being mounted for vibratory motion, and means for imperceptibly vibrating said support at high frequency to compact articles fed onto said belt towards the median line thereof as said belt is advanced over said cross-sectionally concave traverse.

2. Apparatus for compacting articles as they move in spaced relation along a conveyor comprising a support, a belt passing over said support, said support having at least a portion of its upper surface extending upwardly and outwardly from the median line of said belt to shape said belt and form a traverse therefor which is concave in transverse cross-section, means for advancing said belt across said support, said support being mounted for vibratory motion, and means for vibrating said support to compact articles fed onto said belt towards the median line thereof as said belt is advanced over said cross-sectionally concave traverse.

3. Apparatus for compacting articles as they move in spaced relation along a conveyor comprising a support having parallel ends lying in a common plane, an endless belt passing over said parallel ends and across the top of said support, said support having a portion of its upper surface intermediate said parallel ends extending upwardly and outwardly from the median line of said belt to shape said belt and form a traverse therefor which is concave in transverse cross-section, said concave surface portion gradually and smoothly merging towards each end of the support into the plane of the ends of said apparatus, said support being mounted for vibratory motion, and means for vibrating said support at high frequency to compact articles fed onto said belt towards the median line thereof as said belt is advanced over said cross-sectionally concave traverse.

References Cited in the file of this patent

UNITED STATES PATENTS

| Number | Name | Date |
| --- | --- | --- |
| 544,670 | Ingison | Aug. 20, 1895 |
| 763,207 | Ridgway | June 21, 1904 |
| 1,141,861 | Bausman | June 1, 1915 |